United States Patent [19]
Kenny, III

[11] Patent Number: 5,496,012
[45] Date of Patent: Mar. 5, 1996

[54] INDUSTRIAL ROLL-UP DAMPER

[75] Inventor: Larry A. Kenny, III, Rindge, N.H.

[73] Assignee: C&W Fabricators, Inc., Gardner, Mass.

[21] Appl. No.: 176,670

[22] Filed: Jan. 3, 1994

[51] Int. Cl.⁶ .................................................. F16K 31/00
[52] U.S. Cl. ........................................ 251/294; 251/901
[58] Field of Search .................... 251/901, 294; 454/324, 334

[56] References Cited

U.S. PATENT DOCUMENTS

| | | | |
|---|---|---|---|
| 2,349,368 | 5/1944 | Myers | 251/901 |
| 3,049,146 | 8/1962 | Hayes | 251/901 |
| 3,726,313 | 4/1973 | Pandya | 251/901 |
| 3,773,077 | 11/1973 | Barnebey | 251/901 |
| 4,084,617 | 4/1978 | Happe | 251/901 |

*Primary Examiner*—Charles T. Jordan
*Assistant Examiner*—Theresa M. Wesson
*Attorney, Agent, or Firm*—Nields & Lemack

[57] ABSTRACT

An industrial roll-up damper that contains all welded internal attachment components and during normal operation, all moving parts are isolated from the duct flow. In one particular embodiment, the roll-up damper is designed to be used as a gas turbine inlet shutoff damper in conjunction with an inlet dehumidification system. The roll-up damper comprises a single sheet membrane stored on a roll-up spool and an inflatable rubber seal which when applied to gas turbines, functions to isolate the turbine inlet, thereby allowing dehumidified air to be introduced into the intake of the turbines while the engine is not in operation.

9 Claims, 5 Drawing Sheets

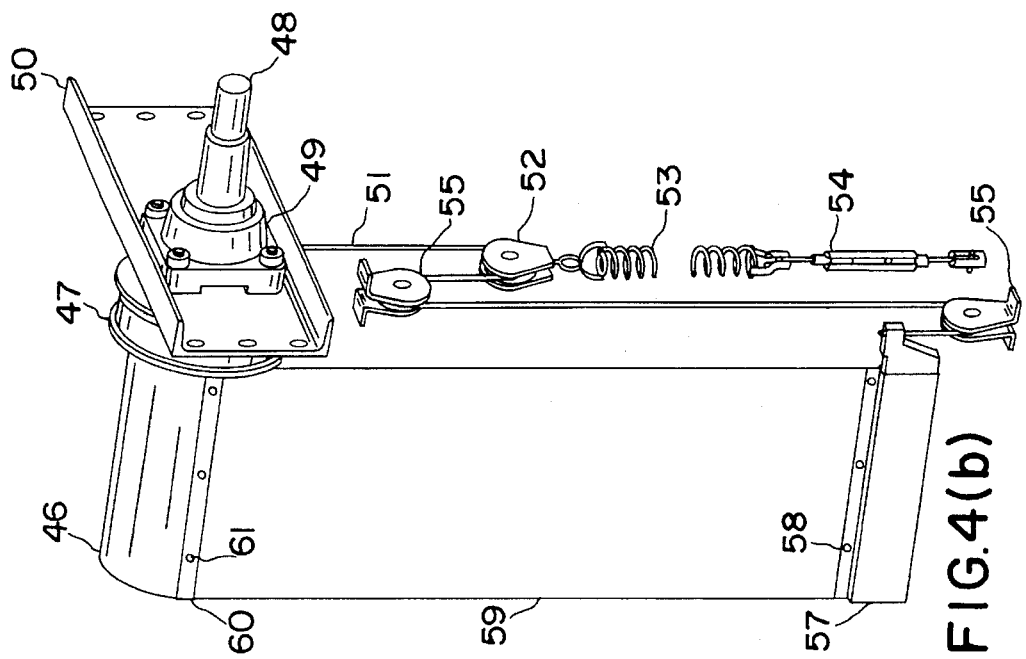
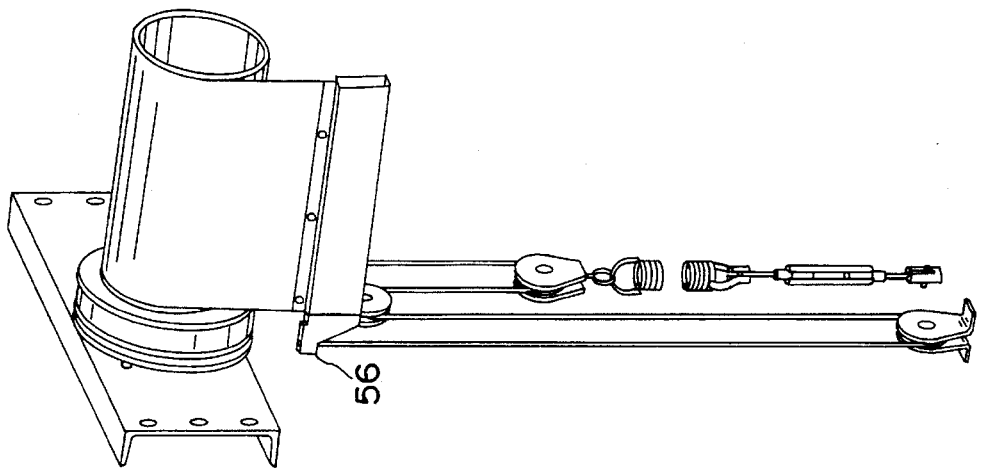
FIG.4(b)
FIG.4(a)

5,496,012

INDUSTRIAL ROLL-UP DAMPER

BACKGROUND OF THE INVENTION

Louver and butterfly isolation valves for clean industrial duct systems, and gas turbines in particular, impose an unwanted pressure drop in the duct flow passing throught the open valve. The pressure drop, due to obstructions in the flow, decreases overall system performance. Moreover, in order to provide low leakage rates, louver and butterfly dampers require the addition of internal seal components which can become detached during normal operation.

Although industrial guillotine type dampers do not obstruct gas flow, their installation into a large duct system typically requires the addition of a supplemental support to carry the increased loading due to the weight of current guillotine designs. Guillotine dampers can achieve low leakage rates, but at the expense of an external seal air fan system. Specifically in the case of gas turbine inlet duct systems, obstructions in the flow path lead to a loss in operating efficiency and shortened turbine life. The possiblity of the gas turbine ingesting dislodged components also limits the use of unnecessary internal components. New gas turbine designs such as the MS 7000FA manufactured by General Electric contain internal components produced with high alloy materials that, during periods of turbine inactivity, are sensitive to moisture corrosion. Moisture will naturally condense out of the ambient air under the proper atmospheric conditions, causing corrosion of the turbine internals leading to a loss of turbine performance and shortened life.

It is therefore an object of the present invention to provide a roll-up damper that operates as a tight shutoff valve, opening and closing a flow path in a large ducting system while minimizing unwanted pressure drop and excessive damper weight.

SUMMARY OF THE INVENTION

The problems of the prior art have been overcome by the instant invention, which provides an industrial roll-up damper that contains all welded internal attachment components and during normal operation, isolates all moving parts from the duct flow. In one particular embodiment, the roll-up damper is designed to be used as a gas turbine inlet shutoff damper in conjunction with an inlet dehumidification system. The roll-up damper comprises a single sheet membrane stored on a roll-up spool and an inflatable rubber seal which when applied to gas turbines, functions to isolate the turbine inlet, thereby allowing dehumidified air to be introduced into the intake of the turbines while the engine is not in operation. The dehumidified air serves to inhibit corrosion of the turbine internals.

BRIEF DESCRIPTION OF THE DRAWINGS

FIG. 4a is a section view of the damper in the open position in accordance with the present invention;

FIG. 4b is a section view of the damper in the closed position in accordance with the present invention.

DETAILED DESCRIPTION OF THE INVENTION

Figure 1:
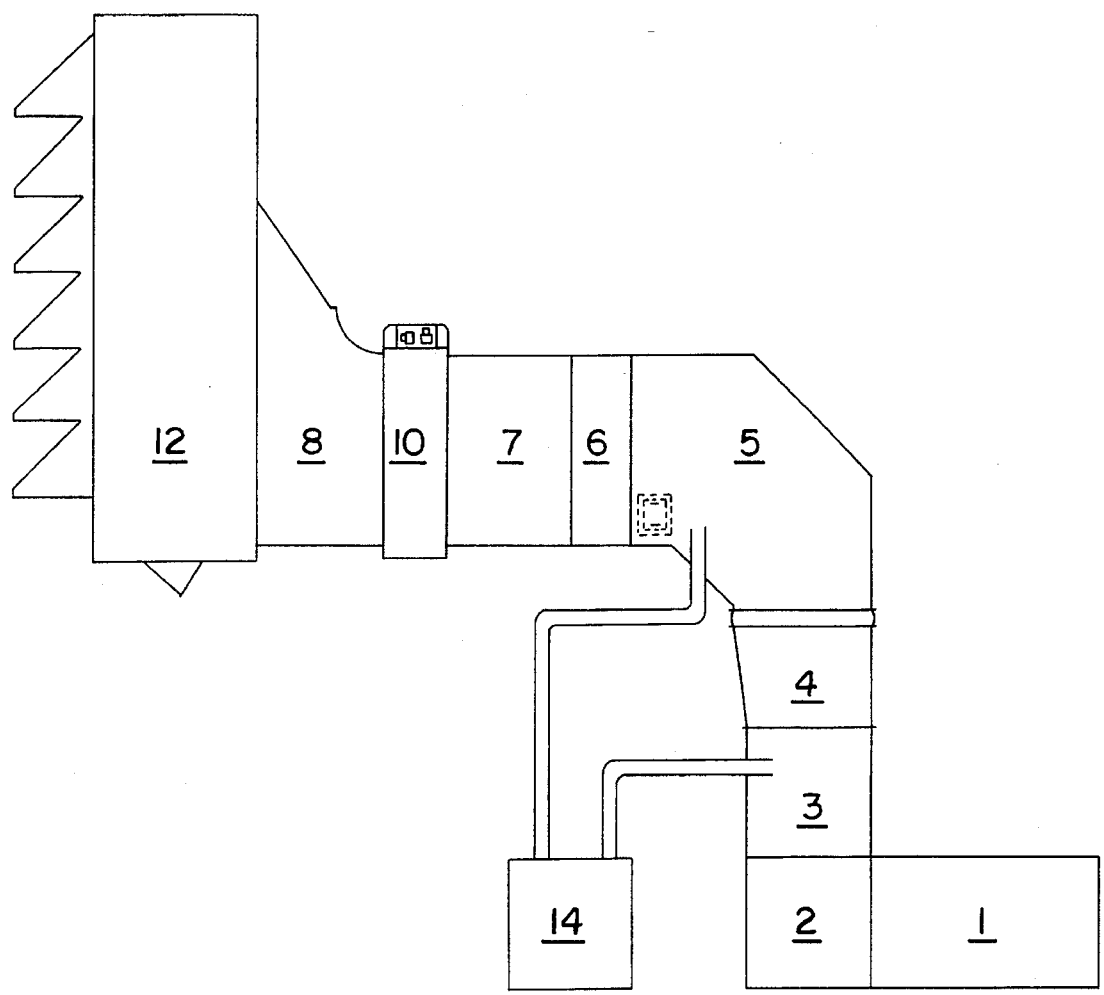
FIG. 1 is a schematic view of a portion of the duct system of a gas turbine with the roll-up damper in place in accordance with one embodiment of the present invention.

Turning first to FIG. 1, there is shown conventional ducting typically associated with the intake section of a gas turbine. Air filter house 12 communicates with a transition duct 8, a silencer duct 7, air heater duct 6, elbow duct 5, transition duct 4, vertical duct 3, intake plenum 2 and gas turbine 1. Preferably the roll-up damper 10 is positioned between the transition duct 8 and the silencer duct 7. A de-humidifier skid 14 is provided to pump dehumidified air into the duct work through suitable piping in order to minimize corrosion inside the turbine.

Figure 2:
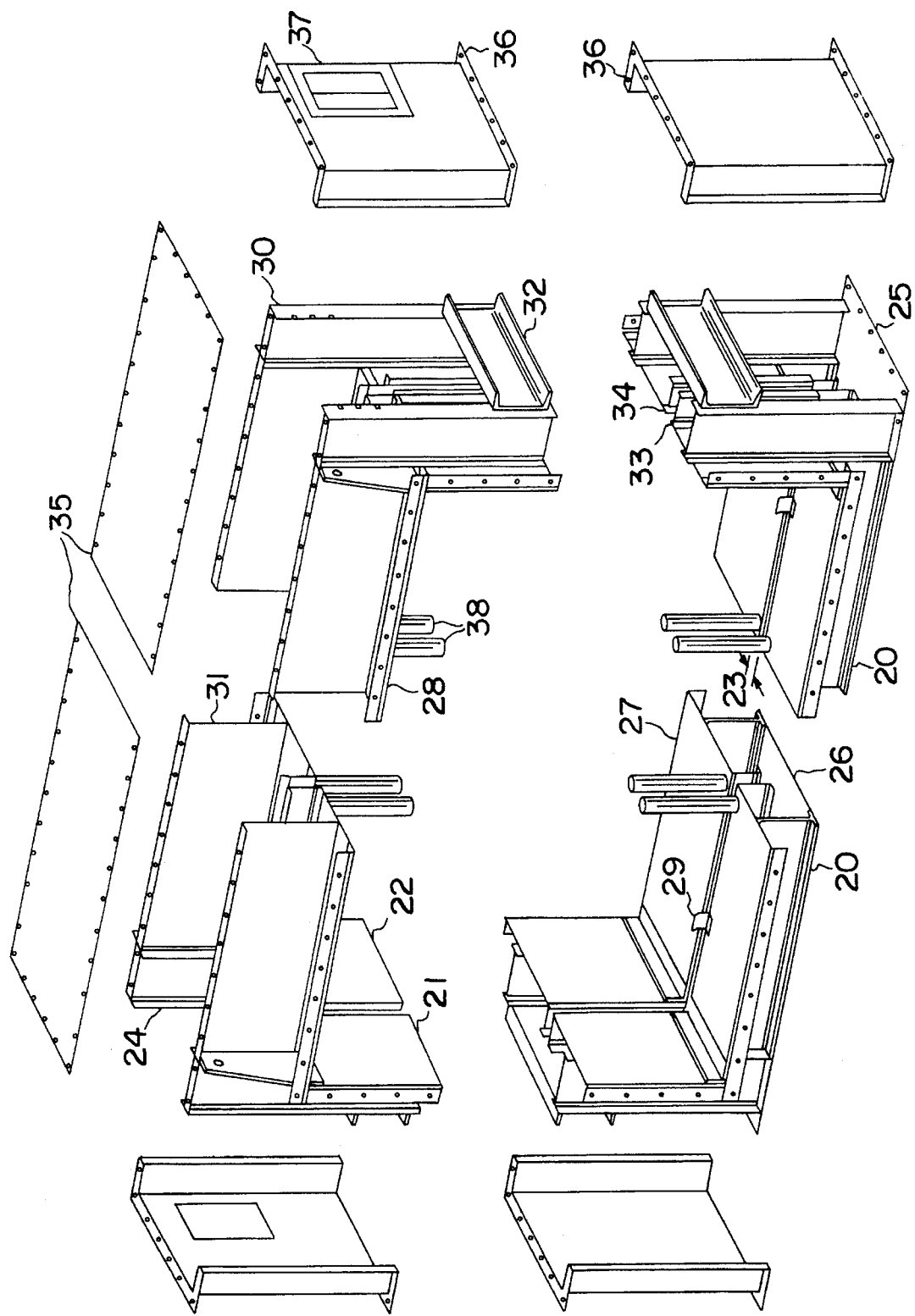
FIG. 2 is an exploded sectional view of the roll-up damper frame in accordance with the present invention.
Figure 5:
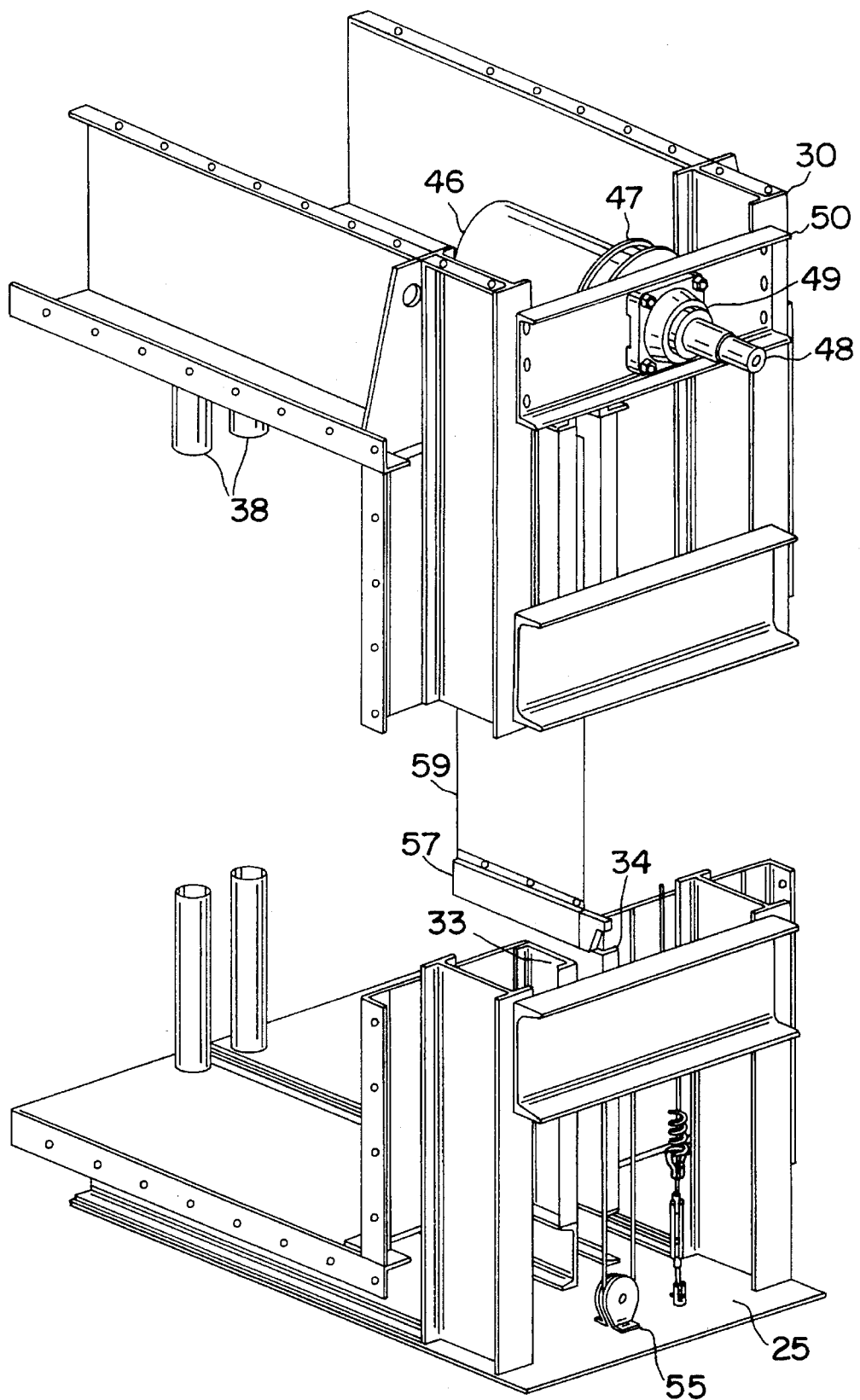
FIG. 5 is a section view of the drive tube mounted in the frame assembly in accordance with the present invention.

FIGS. 2 and 5 illustrate the damper frame assembly 20. The frame assembly 20 is composed of an inlet spool section 21 (flow inlet) and an outlet spool section 22 (flow outlet), each preferably constructed of A36 carbon steel plate reinforced with standard structural and formed shapes (it will be readily understood by those skilled in the art that the particular materials used for construction of the roll-up damper assembly will ultimately depend upon the desired application and its requirements). When the inlet spool section and outlet spool section are brought together, pockets are created around the external perimeter of the resulting damper frame assembly. The side pockets 25 (only one shown) are used to house a counterweight system, pneumatic system and electrical penetration. The roof or top pocket 24 is used to house the roll-up damper membrane and spool, and open position external limit switches. The floor or bottom pocket 26 is used to hide the blade bar while the damper is in the open position and contains the closed position external limit switch.

Removable carbon steel covers 36, 35 are used to enclose the two side and top pockets, respectively. The side covers 36 may be removed in three sections, and at least one section has a clear viewport 37 for positive identification of the blade open position. Top covers 35 are attached to roof stiffeners 31 on the spool sections. A permanently welded bottom cover is used to close the floor pocket. A small access cover is incorporated into the floor reinforcing member on the inlet spool 21 for access to the seal/manifold connection.

Each spool section 21, 22 is comprised of a bolting flange 28 coupled to the duct wall (¼"A36CS plates). A pair of wall stiffener I-beams 30 extend outwardly from the duct walls and define the side pockets. The two spool sections are coupled together with a gap 23 formed between the adjoining sections for the damper membrane to pass through. Spacer channel members 32 are spaced along the length of each spool section to allow for the adjustment of the width of the gap. A pair of stiffener pipes 38 are provided in the flow path of each spool section, which serve to guide the damper membrane in the gap. The pipe sizing is based on optimum aerodynamic performance and can be readily ascertained by those skilled in the art. Blade guide clips 29 are mounted on the bottom of duct spool plate 27 and help center the blade so that it properly passes through gap 23 when lowered.

Figure 3:
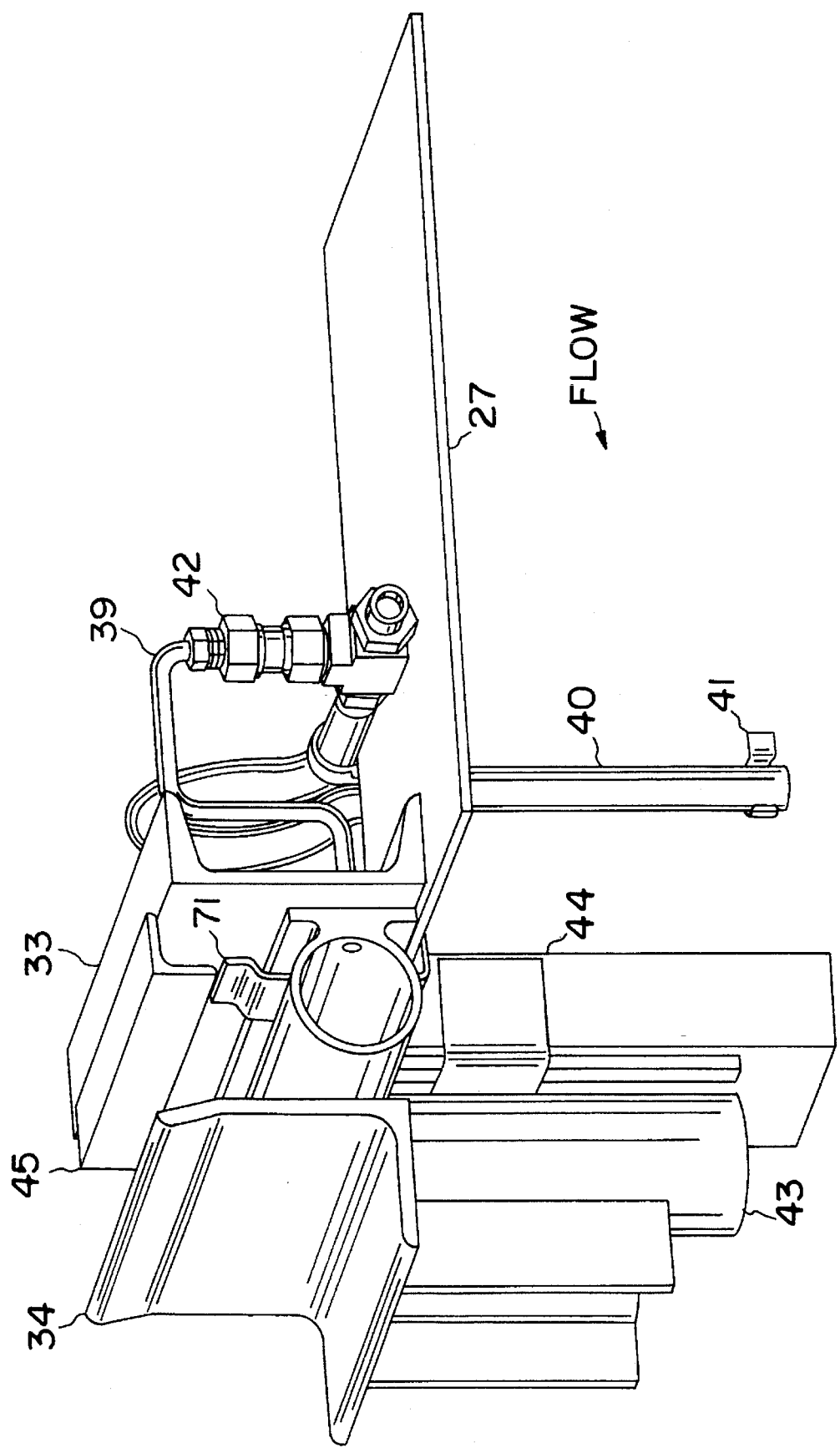
FIG. 3 is a section view of the inflatable seal assembly for use in the roll-up damper in accordance with the present invention.

On the inlet spool 21 is mounted a C-shaped carbon steel seal mount 33 (see also FIG. 3) against which an inflatable seal 43 is mounted. The seal mount 33 is positioned to abut the gap 23 formed between the inlet spool 21 and the outlet spool 22 so that the seal 43, when mounted against the seal mount 33 and inflated, seals against the damper membrane and around the perimeter of the gap 23. A seal seat 34 is provided opposite seal mount 33. A seal cover 45 is mounted on top of seal mount 33 and extends over the seal 43 as shown in FIG. 3. The inflatable seal 43 is in communication with a seal nipple 39 connected to tubing fitting 42 and air manifold 40 which receives pressurized air from a compressor to inflate the seal 43.

FIG. 3 illustrates the mounted seal 43 on seal mount 33. The seal 43 can be mounted and retained by any suitable means, such as with stainless steel brackets or clips 71 and retainer clips 44, each of which can be removable. Air manifold 40, preferably made of polyethylene, is attached to the inlet spool portion 21 and supplies air to the inflatable seal 43 via tubing at four duct centerline locations to allow for quick deflation. The internal air manifold has two external penetrations; the top penetration is the feed to the seal 43 and the bottom is plugged as a drain. Preferably the inflatable seal 43 is EPDM reinforced with cloth such as the PRESPRAY PRS-705 or SEALMASTER P-4. The seal 43 can be inflated even when the damper is in the open position, thereby making the duct continuous and minimizing the possibility of small particles breaking off from the damper apparatus and damaging the turbine.

FIGS. 4a and 4b illustrates the drive tube assembly for mounting the damper. Membrane spool 46 is a carbon steel pipe shaft fabricated with solid end shafts 48. The spool 46 is supported on each end via flange mounted tapered roller bearings 49. The bearings 49 are attached to mounting channels 50 which straddle the side pockets and bolt to the side reinforcing members under the side covers of the damper frame. The mounts are adjustable to provide tracking adjustment of the damper membrane 59. Preferably the damper membrane 59 is a 3-ply polyester reinforced urethane composite sheet attached to the spool 46 by suitable means, such as by stainless steel buttonhead screws 61 through a stainless steel clamping bar 60. The particular composition of the damper membrane 59 will depend upon the environment in which the damper is used, and may include VITON, EPDM rubber, a proprietary 50201 SP3F orange damper material available from Burrell Leder Beltech, Inc., etc. The bottom of the damper membrane is clamped to a reinforcing blade bar 57 fabricated from formed stainless steel tubing. The ends of the blade bar 57 are reinforced with carbon steel inserts which are used to attach counterweight cables and serve as a visual flag for locating the damper open position, and can be seen through the viewport 37 in side cover 36. The drive tube includes a drive shaft 48 which is coupled to an actuator assembly for rotating the drive tube.

The damper is driven by an electromechanical actuator, preferably an AUMA® model SA16.1-6.7B, 1 HP, 900 RPM actuator equipped with limit and torque switches for both directions of travel. The end of travel setting of the actuator limit switches is essential to proper seal operation. The actuator is mounted to the drive tube drive shaft 48.

The drive cable counterweight system is also shown in FIGS. 4a and 4b. The opened weight of the blade 57 is counterbalanced with an extension spring 53 mounted to the outside edges of the damper. A wire rope cable 51 is attached to both ends of the blade bar 57 and is passed through two stationary fixed pulleys 55 and a traveling pulley 52 and terminated on the cable roll-up spool 47 coupled to membrane spool 46 but of a larger diameter than spool 46. The traveling pulley 52 is attached to extension spring 53 which is coupled to a turnbuckle 54 permanently attached to the floor of the unit. The turnbuckles allow for the initial tension to be adjusted. The counterweight system is mounted in the side pockets of the damper frame assembly.

Since the diameter of the cable roll-up spool 47 is greater than the diameter of the damper membrane spool 46, the take-up is greater than the roll out, and as the damper unrolls or closes, tension is increased in the extension spring 53. Specifically, for a damper membrane spool 46 having a diameter of 10.75" and a cable roll-up spool 47 having a diameter of 12.00", the extension spring 53 expands a distance of 8.5 " from the damper open position to the damper closed position, thereby applying tension to the damper membrane 59 and minimizing play when in the closed position.

The roll-up damper inlet damper is supplied with its own control unit for operating the damper through its normal cycle. All operator interfacing to the control unit can be provided via remote switch closure, such as by a turbine logic controller or with local operators included in the control panel. The close cycle operating sequence is as follows:

1. A signal from the turbine controller is made to close the
2. The signal energizes a control relay (CR1), which causes a N.C. contact to open and de-energize a two-way solenoid vent on the seal air manifold. This allows the seal to deflate.
3. The control relay signal is also carried through a differential pressure switch used to indicate low seal pressure. After the seal fully collapses and low seal pressure is achieved, the actuator close contactor (CC) is energized and the damper closes.
4. When the damper reaches the end of its stroke, the limit switches in the actuator open and de-energize the actuator close contactor and the control relay. De-energizing the control relay allows the solenoid to close and the compressor circuit to re-energize thereby inflating the seal. After sufficient seal pressure is achieved, a second differential pressure switch is used to de-energize the compressor actuator.
5. In the closed position, positive indication is provided for with a snap acting DPDT switch located to trip off the blade bar. On the cover of the control panel a red pilot lamp can be provided for indicating a blade closed condition.

The open cycle operating sequence of the roll-up damper is as follows:

1. With the damper in the closed position, a signal from the turbine controller is made to open the damper.
2. The signal energizes a second control relay, which causes a N.C. contact to open and de-energize the two-way solenoid vent on the seal air manifold. This allows the seal to deflate.
3. The control relay signal also passes through the differential pressure switch used to indicate low seal pressure. After the seal fully collapses and low seal pressure is achieved, the actuator open contactor is energized and the damper opens.
4. When the damper reaches the end of its stroke, the limit switches in the actuator open and de-energize the actuator open contactor and the control relay. De-energizing the control relay allows the solenoid to again close and the compressor circuit to re-energize. After the seal inflates and sufficient seal pressure is achieved, the second differential pressure switch is used to de-energize the compressor contactor.
5. In the open position, positive indication is provided for with three snap acting SPDT switches located to trip of the blade bar. On the cover of the control panel, a green pilot lamp can be provided for indicating a blade open condition.

In addition, a third differential pressure switch can be provided to indicate a seal air failure to the controller.

It will be readily understood by those skilled in the art that the roll-up damper can be used in various applications other than gas turbines, in view of the inherent simplicity and flexibility of the design. The size of the opening which can be dampered with the roll-up damper can vary considerably, and the inflatable seal allows the damper to achieve very low leakage; the seal is designed to remain inflated with the damper in the open or closed position, thereby isolating all attachment components outside the gas path. With material substitutions, a side range of flue gas exposures are possible.

What is claimed is:

1. Industrial roll-up damper for a duct system, comprising:
    a damper frame mounted in said duct system, said damper frame comprising an duct inlet section and a duct outlet section with a gap therebetween;
    a drive tube mounted on said damper frame, said drive tube including a drive spool having a first diameter and a roll-up spool having a second diameter greater than said first diameter;
    a damper membrane having a first end mounted on said drive spool of said drive tube and a second floating end including a bottom blade bar, said damper membrane being wrapped around said drive tube when said damper is in said open position, and when said damper is in the closed position, said damper membrane floating end extending into said gap and providing a barrier between said duct inlet section and said duct outlet section;
    a damper counterweight assembly comprising a cable coupled to said blade bar, threaded through two stationary pulleys and a traveling pulley and terminating on said roll-up spool, said traveling pulleys being attached to an extension spring coupled to a turnbuckle; and
    a seal mounted on said damper frame for sealing around the perimeter of said gap.

2. The industrial roll-up door of claim 1, wherein the size of said gap is adjustable.

3. The industrial roll-up damper of claim 1 wherein said seal is inflatable.

4. A roll-up damper comprising:
    a damper frame comprising an inlet duct section, an outlet duct section and a gap formed therebetween;
    a drive tube rotatably fixed to said damper frame, said drive tube comprising a membrane-engaging section having a first diameter and a cable spool section having a second diameter larger than said first diameter;
    a damper membrane having a top portion and a bottom floating portion, said top portion being coupled to said drive tube; and
    means for opening and closing said damper, comprising a cable having a first end fixed to said cable spool section and a second end fixed to said bottom portion of said membrane;
    so that upon rotation of said drive tube, said damper membrane bottom floating portion is lowered through said gap and isolates said inlet duct section from said outlet duct section.

5. The roll-up damper of claim 4, further comprising a perimeter seal around said gap.

6. The roll-up damper of claim 4, wherein the size of said gap is adjustable.

7. Industrial roll-up damper for a duct system having a flow path, comprising:
    a damper frame supported in said duct system, said damper frame comprising a duct inlet section and a duct outlet section with a gap therebetween, said damper frame having an outside perimeter;
    a closed-loop damper comprising:
        a drive tube having a first diameter mounted on said damper frame outside perimeter so as to avoid obstruction of said flow path, said drive tube comprising a drive spool having a second diameter greater than said first diameter;
        a damper membrane having a first end secured to said drive tube and a second floating end;
        a cable having a first end secured to said damper membrane second end and a second end secured to said drive spool; whereby rotation of said drive tube in a first direction causes the lowering of said damper membrane into said gap to obstruct said flow path, and rotation of said drive tube in a second direction causes said damper membrane to wrap around said drive tube and avoid obstruction of said flow path; and
    seal means mounted on said damper frame outside perimeter for sealing around the perimeter of said gap.

8. The industrial roll-up door of claim 7, wherein the size of said gap is adjustable.

9. The industrial roll-up door of claim 7, wherein said sealing means comprises an inflatable seal.

* * * * *